United States Patent

[11] 3,594,846

[72] Inventor Seiji Kimura
  Aoi Mansion Apt. 4-C. 9-20, 3 Chome,
  Jingumae Lhibuya-Kie, Tokyo, Japan
[21] Appl. No. 727,245
[22] Filed May 7, 1968
[45] Patented July 27, 1971

[54] WINDSHIELD WASHER
  6 Claims, 8 Drawing Figs.
[52] U.S. Cl. .................................................... 15/250.02
[51] Int. Cl. .................................................... B60s 1/48
[50] Field of Search .......................................... 15/250.01,
  250.02, 250.03, 250.04

[56] References Cited
  UNITED STATES PATENTS
2,914,256 11/1959 O'Shei ........................... 15/250.02 X
2,927,337 3/1960 Oishei ........................... 15/250.02

Primary Examiner—Peter Feldman
Attorney—Ostrolenk, Faber, Gerb and Soffen

ABSTRACT: A windshield washer system for an automobile is disclosed having a switch responsive to the amount of water sprayed on the windshield by the system to operate the windshield wiper for a predetermined time. The switch includes a pair of contacts actuated by an inflatable bulb. The inflatable bulb expands dependent upon the amount of water flowing through the system and sprayed upon the windshield. A second embodiment is disclosed having a second switch responsive to the flow of detergent through the system to be sprayed upon the windshield to cause predetermined amounts of water to be sprayed upon the windshield and predetermined operation of the windshield wiper.

INVENTOR.
SEIJI KIMURA

BY
OSTROLENK, FABER, GERB & SOFFEN

ATTORNEYS

FIG. 4.

WINDSHIELD WASHER

BACKGROUND OF THE INVENTION

This invention relates to windshield washers and is more particularly concerned with the provision of windshield washer for an automobile wherein the windshield wiper is made responsive to the spraying of water or there cleaning fluid upon the windshield and continues to operate to clean the windshield for predetermined times as necessary requires according to the amount of water or other cleaning fluids sprayed upon the windshield.

Windshield washers have been known and used for many years. They have been found to be of great benefit under numerous driving conditions For instance, windshield washer systems have been found to be of great use hen driving on wet road to clear mud and other dirt splattered on the windshield b cars driving up ahead. These washer systems are also useful in cleaning away bugs and other matter splattered on the windshield.

Windshield washer systems generally consist of a fluid reservoir and fluid pump which operate simultaneously with the windshield wiper or independently thereof. The fluid may either be water or some other cleaning agent. In washer systems where the fluid pump is made to operate simultaneously with the windshield wiper, certain problems usually arise as a result of the fact that the fluid pump and the windshield wiper are operated by the same switch. In such cases, when the fluid pump is turned off as a result of turning off the switch, the windshield wipers follow immediately and the windshield remains wet and covered with either water or whatever particular cleaning agent has been used. It is, therefore, necessary for the operator to employ a second switch to clean the remaining fluid off the windshield. In situations where the fluid pump and the windshield operate independently the same problem exists in that the operator must control at least two switches independently each time he wishes to use the windshield washer.

In another windshield washer system, the fluid pump is caused to operate by a single switch which simultaneously causes operation of the wipers and continues the wipers operating indefinitely until the switch is subsequently manually operated to turn the wiper off. This creates an inconvenience since there must be double operation of the switch and further causes damage to the windshield and wipers resulting from the wipers operating over dry windshields.

The problems created by the above-type windshield washer systems have been recognized and means have been sought to ameliorate the situation. For instance, U.S. Pat. No. 2,877,485 to John R. Oishei, discloses a windshield washer system having a switch which is responsive to the flow or water through the washer system and onto the windshield to operate the motor for the windshield wiper and maintain the motor operating for a short period of time after the water has ceased flowing through the system. Such systems, however, only partially solve the problem. In particular, while the windshield wiper motor continues running for a period of time after the water has ceased to flow it does so independently of the amount of water which has actually been caused to spray upon the windshield. As a result, either the motor will remain operative for the longest period of time necessary to clear water from the windshield even if but a little water has been sprayed upon the windshield or the motor will not be maintained operative for q period sufficient to clear all the water from the windshield in situations where the water pump has been caused to operate for a long period of time due to excessive dirt on the windshield.

The instant invention solves the problem of the prior art windshield washers and in addition provides many advantageous features not previously existing in such windshield washers. In one preferred embodiment of the instant invention a windshield washer system of the type having a water reservoir, a pump, a flow line and a pair of nozzles for directing the water flowing through the flow line onto the windshield of an automobile is provided with an automatic switch connected to the flow line and responsive to the flow of water therethrough for causing the operation of the windshield wiper and for maintaining the windshield wiper operative after the water has ceased to flow for predetermined time depending upon how much water has flowed through the flow lines. The automatic switch includes a plurality of electrical contacts connected in the electric circuit to the windshield wiper motor and an inflatable bulb which is connected to the flow line through a bleed valve. The contacts are caused to engage and disengage upon the inflation and deflation of the bulb. One contact is situated upon a plunger and extends along the axial length thereof for a predetermined distance and a pair of contacts connected to the windshield wiper motor are situated upon the inner surface of a cylindrical member within which the plunger moves responsive to the inflation and deflation of the bulb. When the bulb is inflated as a result of water flowing through the flow line the plunger is forced into the cylindrical member and the contact in the plunger bridges the pair of contact making electrical engagement with them and completing the wiper motor circuit. After the water has ceased to flow the inflatable bulb deflates by forcing its water through the bleed valve and in the process the plunger is moved sufficient distance to cause the disengagement of the contacts.

In a second embodiment of the instant invention an additional automatic switch is placed into the washer system with a reservoir and pump to be used for a detergent. The second automatic switch includes an inflatable bulb which is responsive to the flow of detergent through the flow lines to cause the operation of the windshield wipers and the water pump. Contacts are arranged in the second automatic switch whereby upon the inflation of the bulb a plurality of contacts associated with the windshield wipers are caused to engage and thereafter during the deflation of the bulb additional contacts associated with the water pump are caused to engage. After the bulb has been sufficiently deflated the contacts of both the wipers and the water pump are caused to disengage. Immediately after the operation of this second automatic switch is terminated, the first automatic switch of the first embodiment assumes control of the system. In this manner, the amount of water pumped onto the windshield and the length of time of operation of the windshield wipers are both made to depend upon the amount of detergent expelled onto the windshield.

It is, therefore, one object of the instant invention to provide a windshield washer system whereby the windshield wipers will be operated automatically for a predetermined period of time to clear water or other cleaning fluid from the windshield.

It is another object of the instant invention to provide a windshield washer system whereby the windshield washers operate for a predetermined period of time dependent upon the amount of water or other cleaning fluid sprayed upon the windshield.

A further object of the instant invention is to provide a windshield washer system whereby the use of both a detergent and water in a coordinated manner is accomplished.

An additional object of the instant invention is to provide a windshield washer system using detergent and water whereby the amount of water sprayed upon the windshield is made to depend upon the amount of detergent expelled onto the windshield and whereby the time lag of operation of the windshield wiper is made to depend upon the amount of detergent and water sprayed upon the windshield.

A further object of the instant invention is to provide a new and novel automatic switch capable of coordinating the operation of the windshield wipers of a windshield washer system in dependence upon the amounts of water sprayed upon the windshield.

It is another object of this invention to provide a new and novel automatic switch for a windshield washer system which includes an inflatable bulb for causing the actuation of electrical contacts upon the flow of a fluid through the washer system.

Another object of the instant invention is to provide a new and novel automatic switch for a washer system having a inflatable bulb which maintains a plurality of electric contacts in engagement for predetermined periods of time dependent upon the degree of inflation of the bulb.

It is another object of the instant invention to provide in the second embodiment of the instant invention a new and novel automatic switch which controls the sequential operation of various portions of a windshield washer system.

A further object of the instant invention is to provide a new and novel automatic switch for use in a windshield washer system whereby the switch is responsive to the flow of detergent through the system for causing the sequential operation of the windshield wipers and a water pump for predetermined times dependent upon the amount of detergent which has flowed through the system.

Another object of the instant invention is to provide the automatic switch in the second embodiment with an inflatable bulb which inflates upon the flow of detergent through the windshield washer system to cause the sequential actuation of contacts associated with the windshield wipers and water pump.

The above objects, features and advantages of the instant invention along with additional objects, features and advantages will become apparent upon a reading of the following description of the preferred embodiments of the instant invention in conjunction with the drawings as follows:

Figure 1:
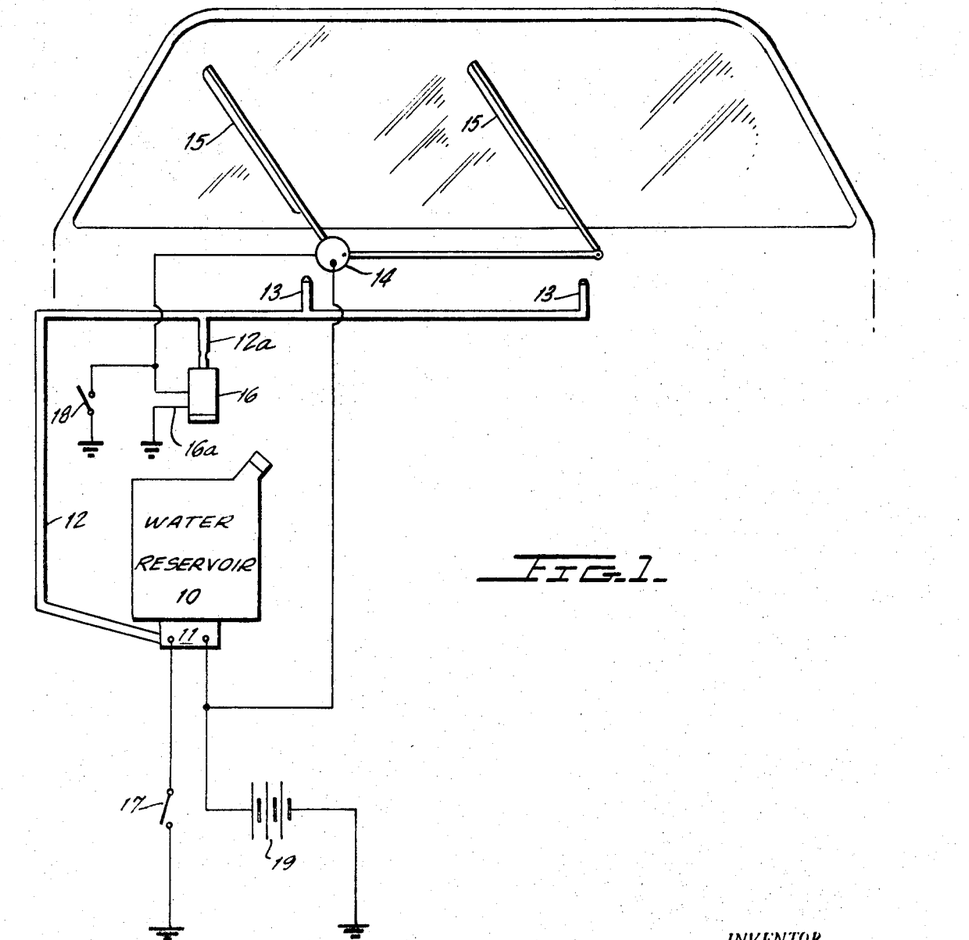
FIG. 1 is a schematic diagram of a first embodiment of the instant invention showing the water flow line and the electric circuitry of the windshield washer system.

Referring to FIG. 1, there is shown a schematic diagram of a first embodiment of the windshield washer system of the instant invention. The system generally includes a water tank or reservoir 10, a water pump 11, a hose or flow line 12 having a plurality of nozzles 13, a windshield wiper motor 14, for operating a pair of wipers 15, and an automatic switch 16. The system further includes a switch 17 in the electrical circuit of the pump 11, and a switch 18 in the electrical circuit of the windshield wiper motor 14. A battery 19 is connected in common to the water pump 11 and to the wiper motor 14.

The system operates in the following manner. If the windshields are clean and it is merely desirable to use the windshield wipers, the switch 18 may be depressed to operate the wiper motor 14 through a circuit including the switch 18, the wiper motor 14, and the battery 19.

At certain times it becomes desirable to cause the discharge of water onto the windshield for enabling the cleaning of the windshield. At such times, the switch 17 is depressed to complete a circuit from ground switch 17 through the pump 11 and through the battery 19. In such case, the pump begins to operate and forces the flow of water through the flow line or hose 12 and through the nozzles 13 which are directed toward the windshield. During this time the water also flows through a hose 12a to the switch 16 to cause the actuation of the switch as to be explained hereinafter. The switch connects the leads 16a and 16b completing the circuit for the windshield wiper motor 14 through the ground leads 16a and 16b, the wiper motor 14 and the battery 19. The wiper motor 14 thereupon causes the movement of the windshield wipers 15 to clear the water from the windshield and in the process clean the windshield.

In many situations the switch 17 will have been depressed for only a very short period as dictated by the amount of dirt on the windshield and the degree of difficulty of removing this dirt. For instance, when driving on a set road shortly after rain the windshield wipers will have little difficulty in removing the dirt and very little water will have to be sprayed on the windshield. On the other hand, in many situations the switch 17 will have to be depressed for a considerably greater period of time, as for instance after the car has been left overnight with mud on the windshield. In such situations a greater amount of water will be necessary to clean the windshield. Clearly, in the above two situations the length of time for which the windshield wipers 15 must continue to operate after the water has ceased flowing is much greater for the situation where a greater amount of water was necessary to clean the windshield. For this reason, the switch 16 is made responsive to the amount of water which has flowed through the flow line or hose 12, as to be explained with respect to FIG. 2. Before continuing, it should be noted that the switches 17 and 18 are both situated on the dashboard of the automobile and they may be of he type controlled by a single knob having three positions—off position, a position for the wiper motor alone, and a position for the water pump alone, or two independent switches.

Figure 2:
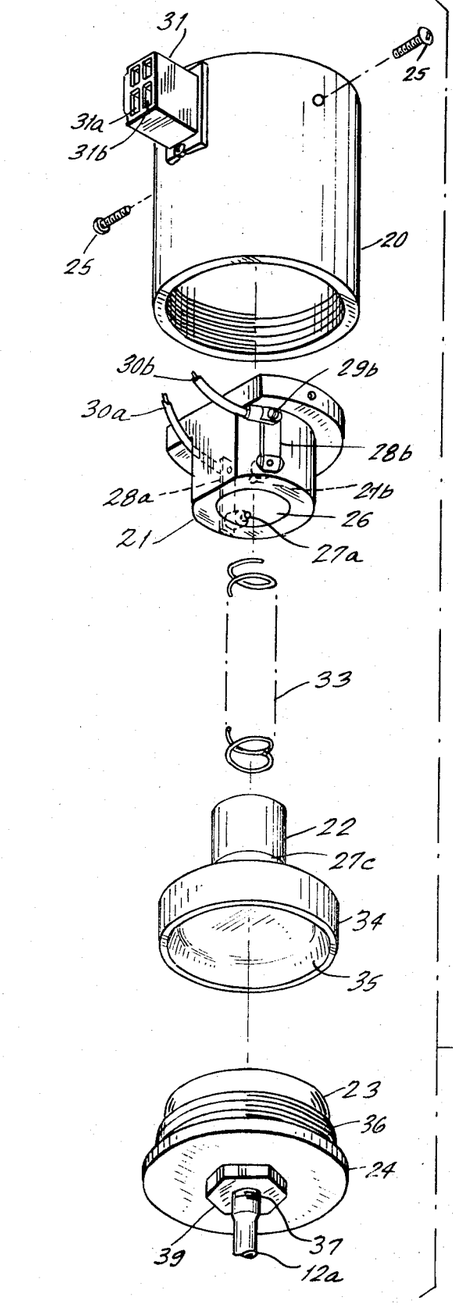
FIG. 2 is an exploded perspective view of an automatic switch of the instant invention for use in the windshield washer system of FIG. 1.
Figure 2A:
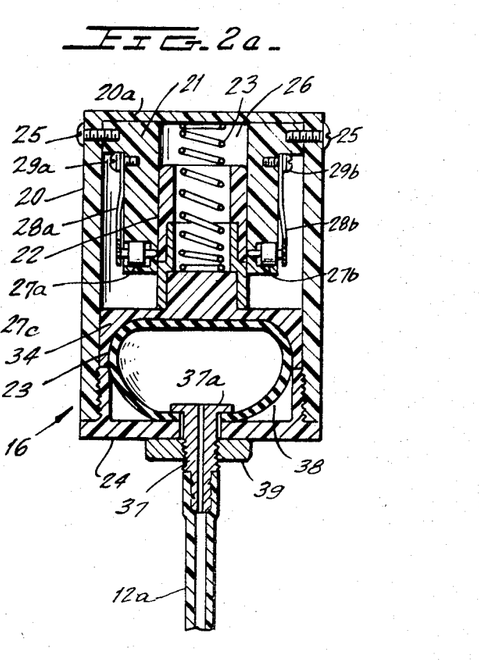
FIG. 2a is a cross-sectional elevated view of the automatic switch of FIG. 2.

Referring next to FIGS. 2 and 2a, there is shown the automatic switch 16 of FIG. 1. The switch unit 16 generally includes a cylindrical housing or casing 20 having a contact support body 21 which is securely mounted within the cylindrical casing 20, a plunger 22, an inflatable bulb 23, and a cover 24.

The casing 20 is a hollow cylinder closed at one end 20a. The contact support body 21 is seated within the casing 20 and is securely fixed therein by means such as screws 25 which may threadedly engage the contact body 21. The contact body 21 has a generally cylindrical shape and has a central cylindrical bore 26 extending therethrough. The contact body supports a pair of contacts 27a and 27b. These contacts may be made of brass or other suitable conductive material and are biased into the bore 26 by means of leaf springs 28a and 28b, respectively. The leaf springs 28a and 28b are also made of conductive material and are secured to the contact mounting body 21 by means of screws 29a and 29b. The screws 29a and 29b are also connected to a pair of conductors 30a and 30b which are attached to electrodes 31a and 31b of the socket 31 on the cylindrical casing 20. Electrodes 31a and 31b are connected in the system of FIG. 1 to leads 16a and 16b.

The plunger 22 includes a hollow shaft portion 32 having a spring 33 seated therein. The spring 33 coacts with end 20a of the cylindrical casing 20 and with the interior surface 33 of the plunger 22 to bias the plunger in the downward direction as seen in FIG. 2a. The plunger 22 also includes an enlarged head 34 having concave face 35. The concave face 35 insures the proper coaction of the plunger 22 with the inflatable bulb 23 upon the inflation and deflation of the bulb.

The shaft of the plunger 22 has mounted thereon a cylindrical bridging contact 27c. This contact 27c is mounted upon the plunger 22 in a position so that when the plunger is forced through the bore 26 of the contact body 21 upon the inflation of bulb 23, as to be described hereinafter, the contact 27c will come into engagement with the contracts 27a and 27b.

The cover 24 of the switch unit 16 is threaded at 36 so that it may be screwed on to casing 20. The cover includes a central opening through which passes a bleed valve 37. The bleed valve 37 has an opening into the inflatable bulb 23. The inflatable bulb 23 rests in the cavity formed by concave face 35 of the plunger 22 and a second concave face 38 in the cover 24.

The inflatable bulb 23 is secured to the cover 24 by the cooperation of the flange 37a and the nut 39 which threadedly fasten the bleed valve 37 to the cover 24. As to be seen, this securement of the bleed valve and inflatable bulb to the cover forms a water tight enclosure so that any water which may be pumped into the inflatable bulb 23 has but one outlet, that being through the bleed valve 37.

In operation, when the water pump 11 of FIG. 1 operates it pumps water through the flow line or hose 12 as described previously. Water is pumped through the hose 12a and the bleed valve 37 into the inflatable bulb 23. The bulb 23 thereupon begins to expand and continues to do so until the pump 11 has ceased operating or until the inflation of bulb 23 is limited by the plunger 22 being forced into abutment against all 20a of cylindrical casing 20. As bulb 23 becomes inflated forcing the plunger 22 upward toward wall 20a, the contact 27c on plunger 22 comes into engagement with the contact 27a and 27b. This causes the operation of wiper motor 14 of FIG. 1 since the contacts 27a, 27b and 27c form a path to ground with leads 16a and 16b.

When the water ceases to flow through the line 12 and through hose 12a into inflatable bulb 23, the pressure exerted by spring 33 and inflatable bulb 23 then begins to force the water out of the inflatable bulb through the bleed valve 37. As the water is being forced out the plunger slowly moves back to its original position due to the bleed valve 37. The smaller the orifice of 37, the slower will be the moving of the plunger. During the time that the water is being forced out of the inflatable bulb 23, the contact 27c slowly rides past the contacts 27a and 27b until a point is reached where the contact 27a and 27b are no longer in engagement with the contact 27c. As soon as this happens, the circuit to the wiper motor 14 is broken by the disconnection of leads 16a and 16. The wiper motor 14 there upon turns off. It should be understood that while contacts 27a, 27b and 27c control the wiper motor 14, the wiper motor 14 should be of the type that always stops with the wipers in a predetermined position. Hence, current in the circuit of motor 14 is cut off by internal contacts (not shown).

As can be seen the contact 27c remains in engagement with the contact 27a and 27b for a period of time which is dependent upon the degree of inflation of inflatable bulb 23. As a result, if the water pump 11 operates for a long period of time inflating inflatable bulb 23 to its maximum degree, the wiper motor 14 will remain on for a maximum period of time after the water pump 11 has ceased. On the other hand, if the water pump 11 a been operated for a relatively short period of time only partially inflating the inflatable bulb 23, the contact 27c will be forced out of engagement with the contacts 27a and 27b in a relatively short period of time after the water pump 11 has ceased. In this manner, the wiper motor 14 is maintained operated only for a period of time which is sufficiently necessary to clean the windshield of water which has been sprayed onto it by mean of the washer system. This eliminates the necessity of continuing the wiper motor operated while the windshield is dry and thereby eliminates the undesirable disturbing effect of the scratching of the windshield wipers over the dry windows and also eliminate the consequent damages to the windshield wipers. It should be noted that while the bulb 23 may be inflated only to a limited degree due to the abutment of plunger 22 against will 20a, this in no way limits the effectiveness of the automatic switch since a point will be reached when the dispensing of additional water on the windshield will not require operation of the wiper for a greater length of time.

Figure 3:
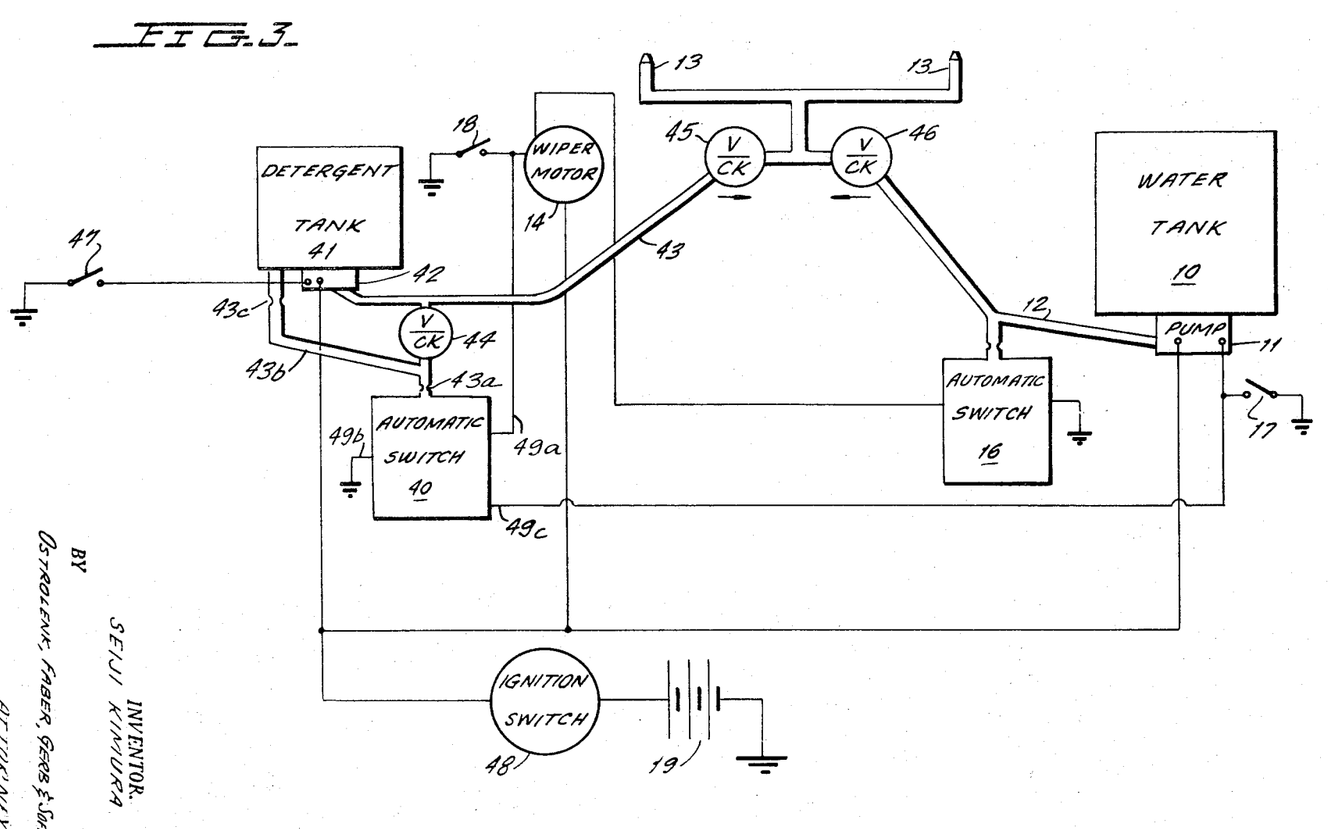
FIG. 3 is a schematic diagram of a second embodiment of the instant invention showing the flow lines and electrical circuitry of the new and novel windshield washer system.

A second embodiment of the instant invention is shown in FIG. 3. This embodiment includes the embodiment of FIG. 1 and adds to it by the provision of a second automatic switch 40 which is operated by the flow of detergent through the washer system. In this embodiment the portions of the system which corresponds to the system of FIG. 1 have been correspondingly labeled.

The system of FIG. 3 adds the provision of a separate detergent system which may be used in cooperation with the water system of FIG. 1. As can be seen the main addition to this system are the provision of the detergent reservoir 41, detergent pump 42 and automatic switch 40. This system also includes a separate flow line or hose 43 and check valve 44, 45 and 46, for the prevention of the mixture of the detergent and water in the sections of the system which are to be segregated.

Considering the operation of the system it should first be recognized that the wiper motor 14 may be made to operate independently by the actuation of contact 18 in the same manner as described with respect to the system of FIG. 1. It should also be recognized that the operation of the water system when used without the detergent is the same as that of the system of FIG. 1. More particularly, switch 17 is actuated to cause the connection of the water pump 11 which thereby causes the flow of water through the hose 12 and through check valve 46 out of nozzle 15 and onto the windshield. The check valve 45 prevents the flow of water into the hose 43 and thereby prevents the mixture of water and detergent in the hose. The automatic switch 16 is connected to the hose 12 through hose 12a in the same manner as previously described with respect to FIG. 1 and it operates in the same manner as described wit respect to FIG. 1.

Next, the operation of the system is to be considered when the detergent aspect is to be used. Initially, the switch 47 is actuated to cause the operation of detergent pump 42 by completing a circuit from ground through switch 47 through the detergent pump 42 through the ignition switch 48 which has been previously turned on to battery 19. The detergent pump causes the flow of liquid through the check valve 44, through the hose 43, check valve 45 and out of the nozzles 15. It is noted that check valve 46 at this point operates to prevent the flow of detergent into the water system.

At the same time that the detergent is flowing through the system and through check valve 44, some of the detergent flows through the hose 43a connected at check valve 44 and into the automatic switch 40. The switch 40 thereupon operates to cause the connection of leads 49a an 49b and thereby starts the wiper motor 14, as to be explained hereinafter. This operation continues until after the switch 47 has been released and detergent has ceased to flow through the detergent system. Shortly after the detergents has ceased to flow, also as to be explained hereinafter, the switch 40 operates to cause the connection of leads 49b and 49c to thereby cause the operation of the water pump 11. It should be noted that the leads 49a and 49b also continue connected for a period of time thereby keeping the wiper motor 14 operating.

After a while the automatic switch 40 releases the connection of leads 49a and 49c to 49b. This release causes the disconnection of the pump 11 and thereby causes the cessation of the flow of water through the system. It should be clear, however, at this point that the release of the connection between leads 49a and 49b does not prevent the wiper motor 14 from continuing to operate since by this time the automatic switch 16 has been caused to operate by the flow of water through the water system, as previously described with respect to FIG. 1. The wiper motor 14, therefore, continues to operate for a period of time dependent upon the degree of inflation of the inflatable bulb of automatic switch 16.

Referring next to FIGS. 4 and 4a through 4c, there is shown the automatic switch 40 of the windshield washer system of FIG. 3. The switch is similar to the one shown in FIG. 2 but does have several modifications which permit it to perform it additional functions. The switch generally includes a cylindrical casing 50, a contact ring 51 which fits within the casing 50, a contact body 52, a plunger 53, an inflatable bulb 54, and a cover 55.

Figure 4:
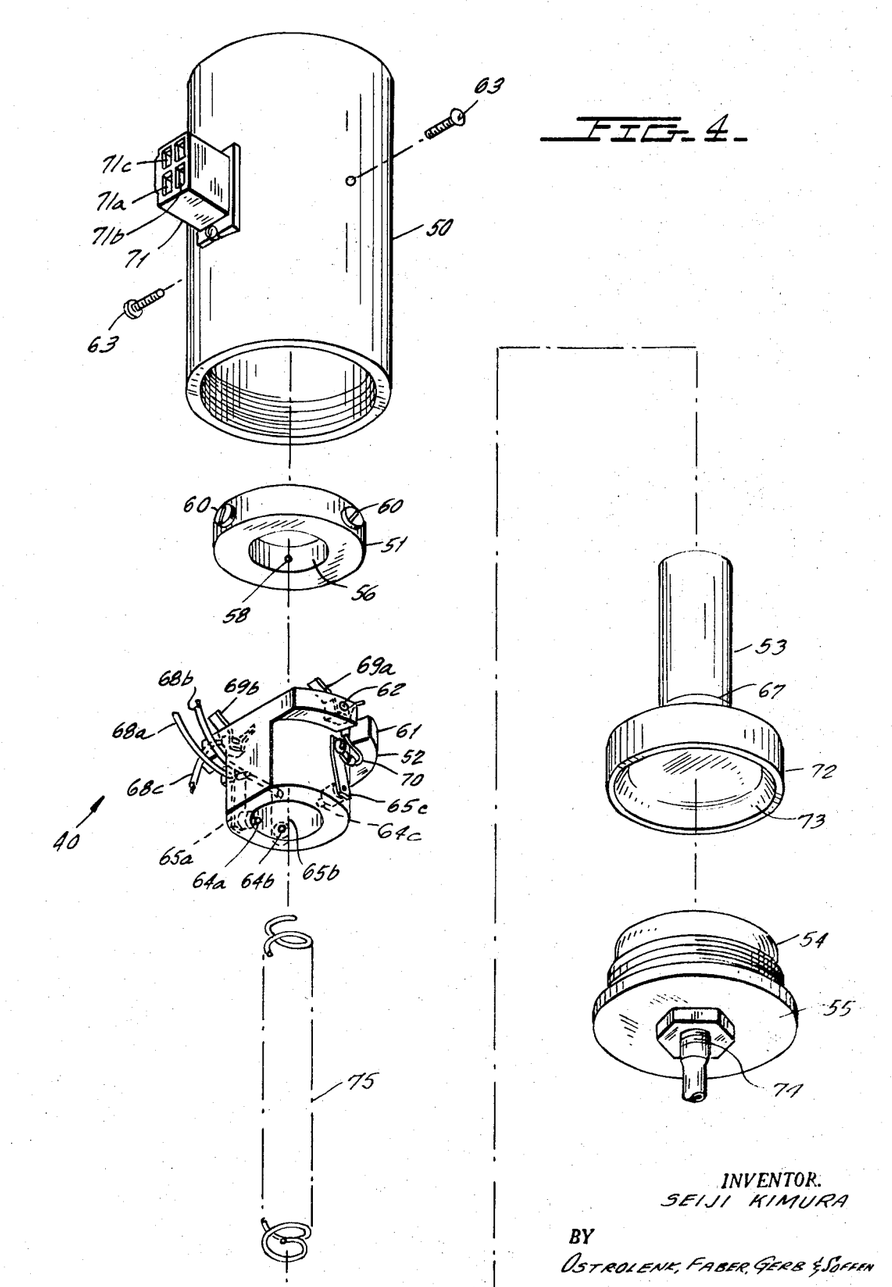
FIG. 4 is an exploded perspective view of the automatic switch 40 of FIG. 3.

The casing 50 includes a solid end portion 50a which has a bore 50b centrally located therein. The opposite end of the casing 50 is threaded for engagement with the casing cover 55.

The contact ring 51 is made of brass or other conductive material. The ring 51 has a bore 56 which extends through the center thereof and further has a plurality of bores 57 which are radially located. The bores 57 do not extend all the way through the ring 51 but rather have constricted openings to the bore 56. Located within the bore 57 are studs 58 which extend through the constricted openings of the bores 57 into the bore 56. These studs are biased into the bore 56 by means of springs 59 which are held against the studs 58 by screws 60. The screw 60 may be of the type that sits flush within the bore 57. By the provision of these springs and the studs which extend into the bore 56, the ring 51 may be slidably mounted to the plunger 53 for reasons to be explained hereinafter.

The contact support body 52 is of generally cylindrical shape having a flange portion 61 which s of substantially the same diameter as the bore in the cylindrical case 50. The flange portion of the contact body 52 includes tapped holes 62 which cooperate with screws 63 for securing the contact support body within the casing 50. The contact support body additionally includes the three contacts 64a, 64b and 64c, which are similar to the contacts 27a and 27b described in FIG. 2. These contacts are maintained in position by leaf springs 65a, 65b and 65c. The contacts 64a, 64b and 64c project into the bore 66, which extends through the contact body 52. The contact 64a, 64b, and 64c are provided to make electrical engagement with a cylindrical bridging contact 67 situated on the plunger 53, as to be explained hereinafter.

Lead 68a, 68b and 70 are connected respectively to leaf springs 65a, 65b and 65c. The lead 68a and 68b are connected in socket 71 to he electrodes 71a and 71b, which are respectively connected to the lead 49a and 49b of FIG. 3. These contacts 642 and 64b in conjunction with the cylindrical bridging contact 67 thereby provides a control for the wiper motor 14 in the system of FIG 3 as to be explained hereinafter.

The contact 64c is not directly connected to an outgoing lead such as are the contacts 64a and 64b. Instead, this contact is connected through a lead 70 to a mustache contact 69a. A second mustache contact 69b is provided on the contact body 52 and this contact is connected to a lead 68c which does make electrical connection with the electrode 71c of the socket 71. The lead 71c is connected to the lead 49c shown in FIG. 3. When the bridging contact ring 51 is brought into engagement with the mustache contact 69a and 69b in a manner to be decried and the cylindrical bridging contact 67 is in engagement with the contact 64b and 64, a circuit to ground is established for the water pump 11 of FIG. 3.

The remaining portions of the automatic switch 40 are similar to the corresponding portions of automatic switch 16 described in FIG. 2. In particular, the automatic switch 40 further includes the plunger 53 having an enlarged head 72 and a cylindrical bridging contact on the shaft of the plunger. The head 72 has a concave portion 73 for cooperation with the inflatable bulb 54 as described with respect to automatic switch 16. The inflatable bulb 54 is attached to the cover 55 by means of the bleed valve 74. As has been noted with respect to the automatic switch 16, the bleed valve 74 seals the inflatible bulb 54 against the cover 55 whereby the flow of fluid into and out of the inflatable bulb 54 is restricted to the passage through the bleed valve 74.

The operation of the automatic switch 40 will next be described in conjunction with the description of the system of FIG. 3. F0r this purpose, reference will be had to FIG. 4a, 4b and 4c, which show the automatic switch 40 in the sequence of operation. It is noted that the operation of the system of FIG. 3 with respect to the use of the windshield wipers alone or with respect to the use of the windshield wipers only in conjunction with the water system have already been described. Therefore, the following description of operating will be limited to the description when the detergent system is employed.

The operation of the detergent system is initiated by the depressing of a contact 47 as shown in FIG. 3. This contact causes the operation of the pump 42 which thereupon causes the pumping of detergent through the check value 44, through conduit 43, check valve 45 and nozzles 15. At the same time, the detergent is also pumped through the conduit 43a and through the bleed valve 74 into the inflatable bulb 54 of the automatic switch 40.

Figure 4A:
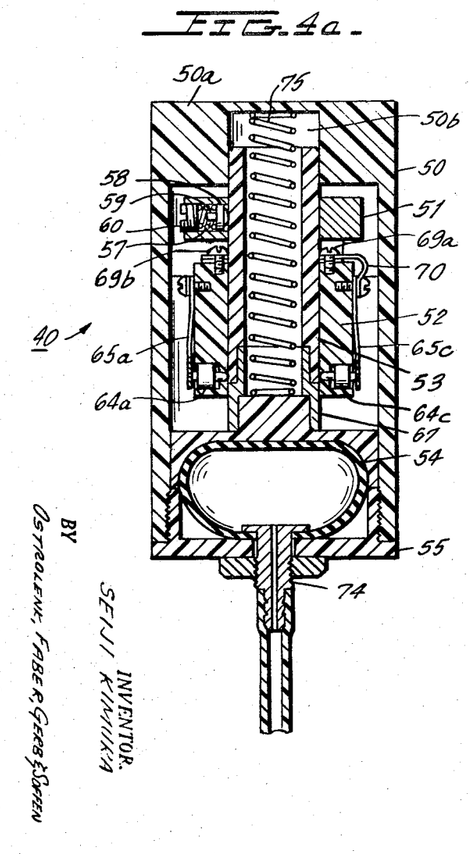
FIG. 4a is a cross-sectional elevated view of the automatic switch of FIG. 4.

As can be seen in the initial position shown in FIG. 4a, the contact 67 is not in engagement with any of the contacts 64a, 64b or 64c. As a result, each of the leads 68a, 68b and 68c provide open circuits for the electrode 71a, 71b and 71c. Thereby, open circuits exist between the leads 49a and 49b and 49c 49b, respectively. At this point, the wiper motor 14 and the water pump 11 are inoperative.

Figure 4B:
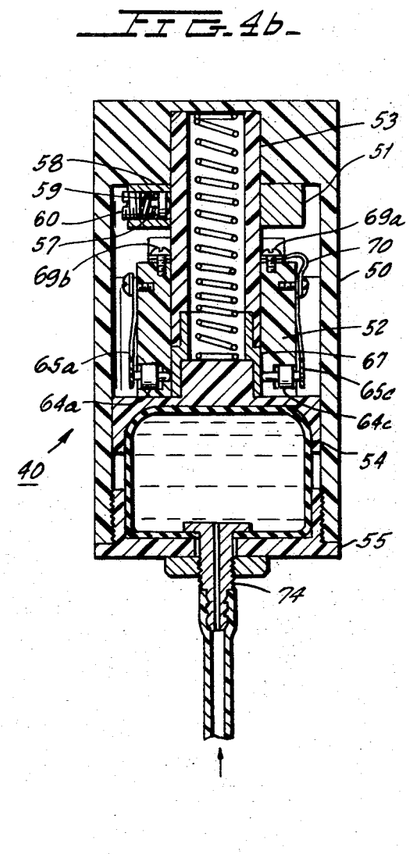
FIGS. 4b and 4c are cross-sectional elevated views of the switch of FIG. 4 showing the sequence of operation of the switch.

After the switch 47 has been depressed for a short while the inflatable bulb 54 begins to expand as a result of the detergent pumped into it by the pump 42 through the check valve 44 and conduit 43a. The expansion of inflatable bulb 54 causes the movement of the plunger 53 in a direction into the bore 50b of the casing 50. As the plunger 53 moves it carries the ring 51 with it as he result of the biasing of the studs 58 against the plunger 53 as has been described previously. Shortly after the plunger has begun to move into the bore 50b the contact 67 makes electrical engagement with the contact 64a, 64b and 64c. At this point, the contacts 64a and 64b and 67 provide a closed circuit through leads 68a and 68b and electrode 71a and 71b to the lead 49a and 49b. The wiper motor 14 thereupon begins to operate. As can be seen, however, the electrode 71c which is connected to the water pump 11 through the lead 49c does not provide a closed circuit for the operation of the water pump 11. This results from the fact that the ring 51 is no longer in engagement with the mustache contacts 69a and 69b since it has moved with the plunger 52 toward the wall 50a. Therefore, an open circuit exists at the electrode 71c. This condition can be seen in FIG. 4b. It is to be noted that while FIG. 4b shows the switch with the bulb 54 fully expanded and the plunger 53 moved into the bore 50b to the maximum degree the same effect is accomplished when the detergent pump 42 has been operated for only a short period of time to only partially inflate the inflatable bulb 54.

The ring 51 moves with the plunger 53 toward the wall 50a during the inflation of bulb 54. However, as soon as the ring 51 abuts against the wall 50a, its movement ceases. The plunger 53 continues to move into the bore 50b thereby causing the ring 51 to be displaced along the longitudinal axis of the plunger 53. It is this displacement of ring 51 which permits the ring 51 to make contact with mustache contacts 69a and 69b during the deflation of bulb 54 to cause operation of water pump 11 as to be explained immediately following.

Figure 4C:
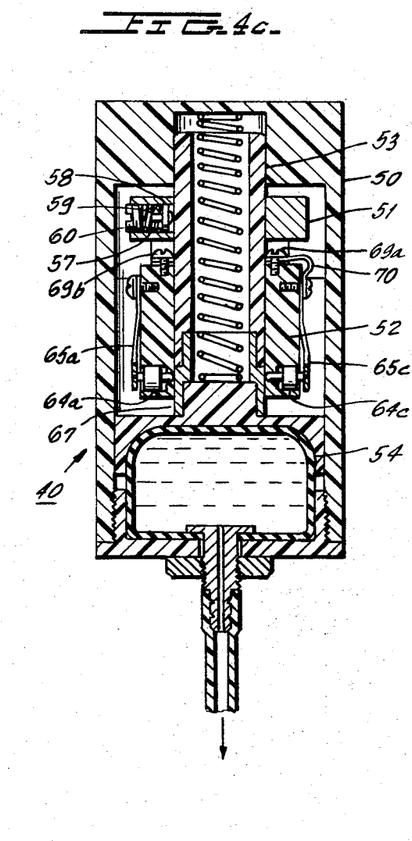

Shortly after the switch 47 has been released so as to disconnect the pump 42 and stop the flow of detergent into the automatic switch 40, the spring 75 cooperates with the plunger 53 and inflatable bulb 54 to slowly force the detergent from the inflatable bulb through the bleed valve 74 and constriction 43c. This detergent is forced through the conduit 43b and through the constricted area 43c back into the detergent reservoir 41. At the same time, the plunger 53 is forced to move back toward its rest position. During this movement the contact 67 remains in engagement with the contact 64a, 64b and 64c for a substantial period of time depending upon the degree of expansion of the inflatable bulb 54. After a very short period of time the ring 5 makes up the short distance between it and the mustache contact 69a and 69b by movement with the plunger 53 away from wall 50a as a result of the biasing of the stud 58 against the plunger 53 which maintains the ring 51 fixed on the plunger 53 during this movement. At this point, the circuit to the water pump 11 is completed through the lead 49c, electrode 71c, lead 68c, mustache contact 69b, ring 51, mustache contact 69a, lead 70, contact 64c, through cylindrical bridging contact 67, and to ground through the contact 64b and lead 49b. The water pump 11 then continues to operate until the plunger 53 is moved a sufficient distance so that the contact 67 becomes disengaged from the contacts 64a, 64b and 64c.

Upon the disengagement of the contact 67 from the contact 64a, 64b and 64c, the water pump 11 is turned off and the control of the wiper motor 14 is transferred to the automatic switch 16 since by this time the flow of water through conduit 12 and conduit 12a has caused the connection of contacts 27a, 27b and 27c as described with respect to the system of FIG. 1 and switch 16 in FIG. 2 and 2a.

As should be clear from the above, the system of FIG. 3 provides the features that the length of operation of the wiper motor 14 and the length of operation of the water pump 11 are made dependent solely upon necessity as determined by the amount of detergent which is forced to flow through the system and which causes the inflation of the inflatable bulb 54. This timed relationship exits because the length of time of the operation of the pump 11 is determined by the degree of inflation of the inflatable bulb 54 and the constricted orifice of 43c. Furthermore, the length of time of operation of the wiper motor 14 is determined initially by the length of time during which the automatic switch 40 is operated responsive to the flow of detergent plus the additional time which is provided by the timed relationship of the automatic switch 16 as described with respect to the system of FIG. 1.

As can be seen from the above description, a windshield wiper system has been presented in a first embodiment of the instant invention whereby the windshield wipers of the system are automatically responsive to the flow of water in the washer system to operate for predetermined periods of time depending upon the amount of water necessary to be wiped from the windshield.

It should also now be clear that in the second embodiment of the instant invention a windshield washer system has been provided which exhibits the features of permitting operation of the system in three different modes, that is the windshield wiper alone; the windshield wiper in conjunction with a water system; and the windshield wiper in conjunction with a detergent and water system. Furthermore, similar to the first embodiment, this windshield washer system provides automatic switching means for controlling the operation of the windshield wipers and the water pump in dependence upon the necessity created by the amount of detergent caused to be expelled upon the windshield.

By the provision of the above embodiments of the instant invention, a windshield washer system is provided eliminating the inconveniences existing in prior systems, such as unnecessary use of a plurality of manual switches and the unnecessary damage to windshield wipers resulting from their movement over dry windshields.

While the instant invention has been described with respect to several preferred embodiments thereof, many modifications and variations will now become apparent to those skilled in the art. It is, therefore, desired that the scope of the invention not be limited by the disclosure herein but rather by the appended claims.

The embodiments of the invention in which an exclusive privilege or property I claim are defined as follows:

1. In a windshield washer of the type having windshield wiper means and means for dispensing a fluid upon a windshield for assisting in the cleaning of said windshield:
   automatic switch means operatively connected to said wiper means and responsive to the operation of said dispensing means for causing the operation of said wiper means;
   said automatic switch means including diaphragm means; conduit means between said dispensing means and said diaphragm means for distributing a portion of said dispensed fluid to said diaphragm means; said diaphragm means being an inflatable bulb means which is gradually inflatable continuously over a period of time by said portion of said fluid dispensed by said dispensing means;
   flow restriction means connected in said conduit means between said dispensing means and said diaphragm means for causing fluid to gradually enter said inflatable bulb means, said flow restriction mean also being adapted to cause said bulb means to deflate at a predetermined gradual rate after said dispensing mean has ceased operating;
   whereby said flow restriction means maintain said wiper means in operation for a predetermined period of time dependent upon the amount of fluid dispensed by said dispensing means;
   electrical contact means associated with said wiper means; means operatively connected between said diaphragm means and said electrical contact means for actuating said electrical contact means to cause operation of said wiper means upon the flow of said dispensed fluid to said diaphragm means and upon the inflation of said inflatable bulb mean;
   second automatic switch means and second dispensing means for dispensing a second fluid upon said windshield; said second automatic switch means operatively connected to said wiper means and being responsive to the operation of said second dispensing means for causing the operation of said wiper means;
   said second switch means further including means operatively connected to said first dispensing means responsive to the termination of operation of said first dispensing means for causing the operation of said first dispensing means for a predetermined time thereafter dependent upon the amount of said second fluid dispensed.

2. In a windshield washer of the type having windshield wiper means and means for dispensing a fluid upon a windshield for assisting in the cleaning of said windshield:
   automatic switch means operatively connected to said wiper means and responsive to the operation of said dispensing means for causing the operation of said wiper means;
   said automatic switch means including diaphragm mean; conduit means between said dispensing means and said diaphragm means for distributing a portion of said dispensed fluid to said diaphragm means; said diaphragm means being an inflatable bulb means which is inflatable by said portion of said fluid dispensed by said dispensing mean;
   flow restriction means connected in said conduit means between said dispensing means and said diaphragm means for causing fluid to gradually enter said inflatable bulb means; said flow restriction means also being adapted to cause said bulb means to deflate at a predetermined gradual rate after said dispensing means has ceased operating; electrical contact means associated with said wiper means; means operatively connected between said diaphragm means and said electrical contact mean for actuating said electrical contact means to cause operation of said wiper means upon the flow of said dispensed fluid to said diaphragm means and upon the inflation of said inflatable bulb means;
   second automatic switch means and second dispensing means for dispensing a second fluid upon said windshield; said second automatic switch means operatively connected to said wiper means and being responsive to the operation of said second dispensing means for causing the operation of said wiper means;
   said second switch means further including means operatively connected to said first dispensing means responsive to the termination of operation of said second dispensing means for causing the operation of said first dispensing means for a predetermined time thereafter dependent upon the amount of said second fluid dispensed.

3. In a windshield washer system as set forth in claim 2, wherein wherein said first fluid is water and said second fluid is a detergent.

4. In a windshield washer system set forth in claim 3 wherein said second automatic switch means includes second inflatable bulb means; conduit means connected between said second dispensing means and said second inflatable bulb mean for diverting a portion of said detergent dispensed to said second bulb means thereby inflating said second bulb means; a second movable shaft movable in response to the inflation and deflation of said second bulb means; electrical contact support means rigidly secured in said second automatic switch mean; first contact means mounted to said support means and electrically connected to said wiper means; second contact means mounted to said support means and electrically connected to ground; and cylindrical bridging contact means on said movable second shaft and movable with said second shaft upon inflation of said second bulb means to engage said first and second contact means and complete a circuit to said wiper means.

5. In a windshield washer system as set forth in claim 4 further including third contact means on said support means electrically connected to said first dispensing means; fourth contact means on said support means electrically connected to ground through said cylindrical bridging contact when said second bulb means is inflated; and ring contact means movable mounted to said second shaft movable out of engagement with said third and fourth contacts during inflation of said second bulb means and movable into engagement with said third and fourth contacts during deflation of said second bulb means to complete a circuit to said first dispensing means whereby said first dispensing means is operated after said second dispensing means has ceased operating and for a predetermined time depending upon the degree of inflation of said second inflatable bulb.

6. In a windshield washer system as set forth in claim 1 wherein said first fluid is water and said second fluid is a detergent.